(12) United States Patent
Shih et al.

(10) Patent No.: US 7,786,747 B2
(45) Date of Patent: Aug. 31, 2010

(54) MICRODISPLAY ASSEMBLIES AND METHODS OF PACKAGING MICRODISPLAYS

(75) Inventors: Wei-Yan Shih, Plano, TX (US); Bradley Morgan Haskett, Allen, TX (US); Braden Peter D'Andrea, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 178 days.

(21) Appl. No.: 11/948,637

(22) Filed: Nov. 30, 2007

(65) Prior Publication Data

US 2009/0140757 A1 Jun. 4, 2009

(51) Int. Cl.
*G01R 31/00* (2006.01)
(52) U.S. Cl. ...................................... 324/770
(58) Field of Classification Search ........................ None
See application file for complete search history.

(56) References Cited

U.S. PATENT DOCUMENTS

| 6,005,649 A * | 12/1999 | Krusius et al. ............... 349/73 |
| 6,177,288 B1 * | 1/2001 | Takiar ........................... 438/15 |
| 6,455,927 B1 * | 9/2002 | Glenn et al. .................. 257/686 |
| 6,562,640 B1 * | 5/2003 | Tseng et al. .................... 438/15 |
| 6,571,466 B1 * | 6/2003 | Glenn et al. ..................... 29/841 |
| 6,603,183 B1 * | 8/2003 | Hoffman ...................... 257/434 |
| 6,624,921 B1 * | 9/2003 | Glenn et al. .................. 359/291 |
| 6,750,939 B2 * | 6/2004 | Sojourner et al. ............ 349/189 |
| 7,480,017 B2 * | 1/2009 | Fisher et al. ................... 349/96 |
| 7,517,712 B2 * | 4/2009 | Stark ............................. 438/51 |
| 2002/0001051 A1 * | 1/2002 | Krusius et al. ................. 349/73 |
| 2002/0159020 A1 * | 10/2002 | Sojourner et al. ........... 349/189 |
| 2003/0215129 A1 * | 11/2003 | Yang et al. .................... 382/149 |

* cited by examiner

*Primary Examiner*—Jermele M Hollington
(74) *Attorney, Agent, or Firm*—Charles A. Brill; Wade James Brady, III; Frederick J. Telecky, Jr.

(57) ABSTRACT

Microdisplay assemblies, methods of packaging microdisplays, and methods of testing microdisplays are disclosed. In accordance with one embodiment, a microdisplay assembly includes a support and a microdisplay disposed on the support. The microdisplay includes a semiconductor workpiece mounted to the support and an optical device region disposed over the semiconductor workpiece. A plurality of contacts is disposed over a portion of the semiconductor workpiece, wherein each of the plurality of contacts comprises a protruding feature.

19 Claims, 7 Drawing Sheets

MICRODISPLAY ASSEMBLIES AND METHODS OF PACKAGING MICRODISPLAYS

TECHNICAL FIELD

The present invention relates generally to microdisplays, and more particularly to the packaging of optical semiconductor devices.

BACKGROUND

Some projection display systems use microdisplays, such as DMDs or deformable micromirrors, to generate an image on a display plane. In general, a microdisplay in a projection display system is used to create a miniature version of the image to be displayed, and optical lenses and elements are used to project an enlarged version of the image on the display plane.

DMDs are used in DLP® technology as optical switches or transmitters for television (TV) and projection systems. DMDs are optical semiconductor devices having an array of thousands or up to millions of micromirrors that are switched on or off at varying frequencies, forming a digital image. DMDs are extremely precise light switches that are capable of modulating light. Digital video or graphics are reproduced by the DMDs and projected onto a screen. Some projection systems may comprise a single DMD, whereas other projection systems may include three DMDs, as examples. Projection systems that utilize DMDs have a high fidelity and improved picture quality.

Other optical semiconductor devices used in projection systems include liquid crystal on silicon (LCOS) and liquid crystal display (LCD) microdisplay panels, for example. Optical semiconductor devices such as DMDs, LCOS microdisplay panels, and LCD microdisplay panels are relatively high cost components of a projection system. It is desirable to decrease component costs in order to lower the overall cost of projection systems. Thus, what are needed in the art are optical semiconductor devices having a reduced cost.

SUMMARY OF THE INVENTION

These and other problems are generally solved or circumvented, and technical advantages are generally achieved, by embodiments of microdisplay assemblies, methods of packaging microdisplays, and methods of testing microdisplays.

In accordance with an embodiment, a microdisplay assembly is provided. The microdisplay assembly includes a support and a microdisplay disposed on the support. The microdisplay includes a semiconductor workpiece mounted to the support and an optical device region disposed over the semiconductor workpiece. A plurality of contacts is disposed over a portion of the semiconductor workpiece, wherein each of the plurality of contacts comprises a protruding feature.

In accordance with another embodiment, a method of packaging a microdisplay is provided. The method includes providing a support and providing a microdisplay, the microdisplay including a semiconductor workpiece and an optical device region disposed over the semiconductor workpiece. The method includes attaching the microdisplay to the support and forming a plurality of contacts over the semiconductor workpiece, wherein each of the plurality of contacts comprises a protruding feature.

In accordance with another embodiment, a method of testing a microdisplay is provided. The method includes providing a microdisplay, the microdisplay including a semiconductor workpiece and an optical device region disposed over the semiconductor workpiece, the semiconductor workpiece being attached to a support. A plurality of contacts is formed over the semiconductor workpiece, each of the plurality of contacts comprising a protruding feature. The microdisplay is tested by probing at least one of the plurality of contacts.

An advantage of an embodiment is reduced packaging costs and reduced costs for microdisplay assemblies.

A further advantage of an embodiment is providing flexibility in the types of connectors used in microdisplay assemblies.

Yet another advantage of an embodiment is providing the ability to repeatedly test a microdisplay assembly without causing damage to the bond pads.

The foregoing has outlined rather broadly the features and technical advantages of embodiments in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely in the packaging of microdisplays. The microdisplay assemblies described herein may be adapted for use in televisions (TV), projectors, and cinema applications. The microdisplay assemblies may be implementable in a wide variety of system form factors, ranging from theater models to desktop models to small handheld models, as examples.

Figure 1:
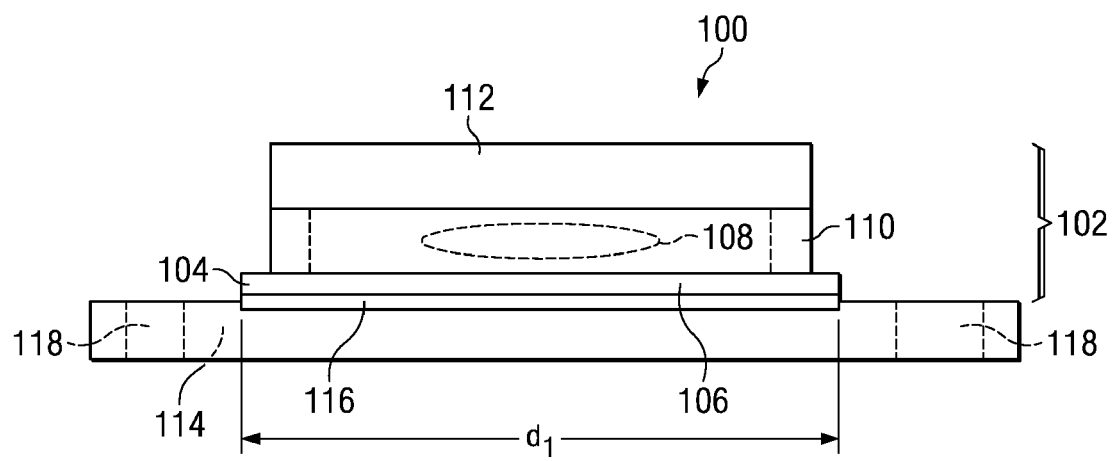
FIG. 1 is a cross-sectional view of a microdisplay assembly comprising a microdisplay including an optical device region formed over a semiconductor workpiece, the workpiece being mounted on a support.

With reference now to FIG. 1, there is shown a cross-sectional view of a microdisplay assembly 100 comprising a microdisplay 102 including an optical device region 108 formed over a semiconductor workpiece 104. The optical device region 108 may comprise an array of micromirrors, e.g., of a DMD device in some embodiments. The optical device region 108 may also comprise other types of optical devices, such as an LCOS microdisplay panel or an LCD microdisplay panel, as examples. The optical device region 108 may be formed over an active area 106 of the workpiece 104. An interposer 110 may be formed surrounding the optical device region 108, and a transparent window 112 may be formed over the interposer 110. The interposer 110 may have rounded inner corners and may separate the window 112 from the workpiece 104. The interposer 110 and window 112 protect the optical device region 108 from damage and debris during transportation, installation and operation, for example. Alternatively, the microdisplay 102 may comprise an apertured window 112, for example, including an aperture formed within the transparent window 112 over at least a portion of the active area 106. The aperture of the window may comprise a thin layer of a light-absorbing stack of materials, for example.

The workpiece 104 is attached using an adhesive 116, for example, to a support 114. The support 114 may comprise a metal such as aluminum or steel, as examples, although alternatively, the support 114 may comprise other metals or materials, such as plastic or ceramic. In some embodiments, the support 114 preferably comprises a metal so that it functions as an improved heatsink for the microdisplay 102, for example. The support 114 may comprise an alignment plate having a plurality of alignment marks 118, as shown. The support 114 may comprise a metal slug that is machine-ground to ensure dimensional accuracy, for example. The support 114 may also comprise a stamped metal slug, as another example.

The workpiece 104 of the microdisplay 102 may include a semiconductor substrate comprising silicon or other semiconductor materials covered by an insulating layer, for example. The workpiece 104 includes an active area 106 that is adapted to control or interface with the optical device region 108. The active area 106 may comprise an array of static memory cells such as static random access memory (SRAM) devices, as an example, although other types of memory devices or other devices adapted to interface with the optical device region 108 may also be used. The workpiece 104 may also include active components or circuits, not shown. The workpiece 104 may comprise silicon oxide over single-crystal silicon, for example. The workpiece 104 may include other conductive layers or other semiconductor elements, e.g., transistors, diodes, etc. Compound semiconductors, GaAs, InP, Si/Ge, or SiC, as examples, may be used in place of silicon. The workpiece 104 may comprise a silicon-on-insulator (SOI) substrate, for example. The workpiece 104 may be processed using techniques used in microelectromechanical system (MEMS) processing, for example, to form an optical device region 108 comprising an array of micromirrors including thousands or millions of micromirrors over the active area 106, for example.

A plurality of microdisplays 102 may be fabricated simultaneously on a semiconductor wafer, for example, and the microdisplays 102 are singulated, e.g., using a saw. The microdisplays 102 may optionally be tested before singulation, for example. The interposer 110 and window 112 may be installed before or after singulation, for example. The workpiece 104 of the microdisplay 102 may comprise a width or dimension $d_1$ of about ⅓ cm to about 3 cm, as examples, although alternatively, the workpiece 102 may comprise other dimensions. The singulated workpiece 102 may be substantially square or rectangular, for example.

Figure 2:
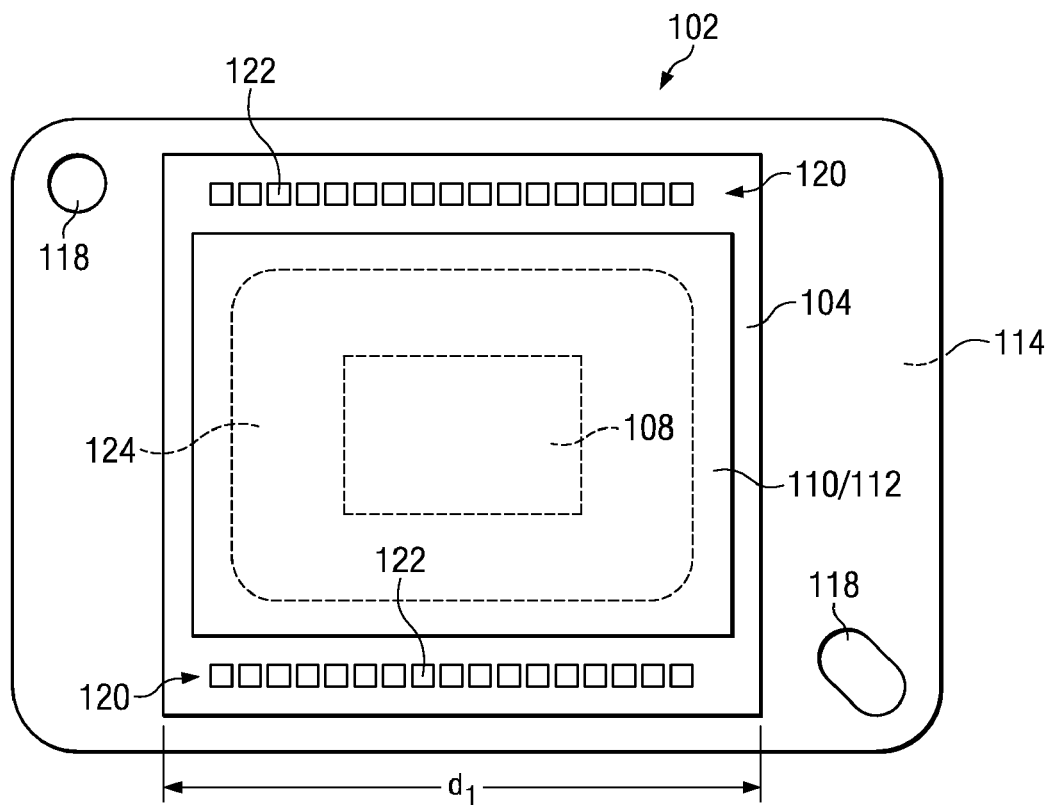
FIG. 2 shows a top view of the microdisplay assembly shown in FIG. 1.

FIG. 2 shows a top view of the microdisplay assembly 100 shown in FIG. 1. The alignment marks 118 of the support 114 may be circular or oval, as shown. Alternatively, the alignment marks 118 may comprise other geometric shapes such as rectangular holes, V-shaped notches, U-shaped notches, half-circular notches, or precision-ground edges, as examples, not shown. The alignment marks 118 may be used to align the microdisplay assembly 100 with optical components of a projection system, not shown, for example. The optical device region 108 may be disposed proximate a central region of the microdisplay 102. If the optical device region 108 comprises a micromirror array, the micromirror array may be surrounded by a light shield region 124 of low reflectance to improve the micromirror array performance, for example.

The microdisplay 102 includes a contact region 120 on at least one side. In the embodiment shown in FIG. 2, the microdisplay 102 includes a contact region 120 on two opposing sides, for example. The contact region 120 comprises a plurality of bond pads 122. The bond pads 122 may be square or rectangular, for example, and may comprise a metal such as aluminum or copper.

Figure 3:
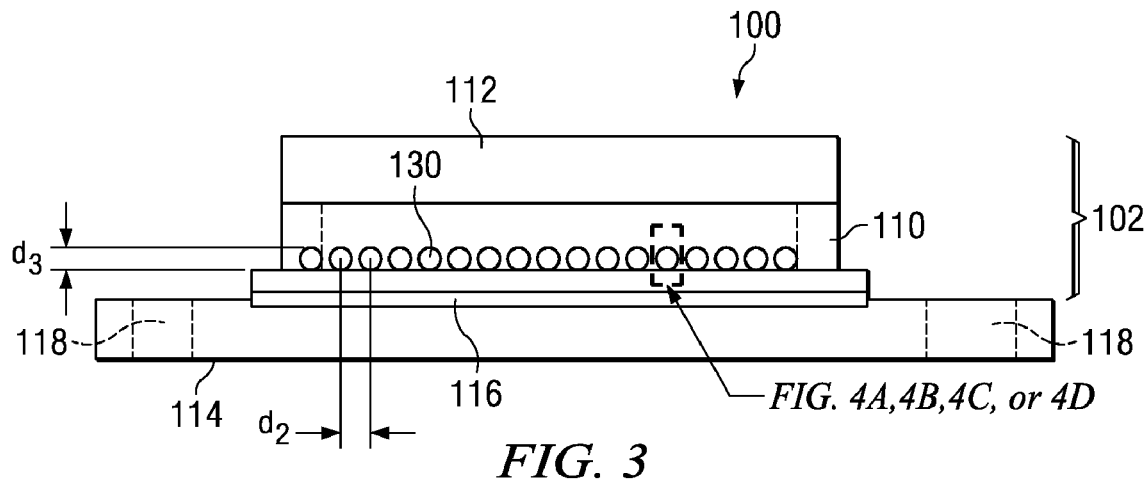
FIG. 3 shows a cross-sectional view of a microdisplay assembly in accordance with an embodiment wherein a plurality of contacts comprising protruding features are formed over a portion of the semiconductor workpiece.

In accordance with embodiments, a plurality of contacts 130 comprising protruding features is formed over the bond pads 122 of the contact region 120 of the workpiece 104, as shown in FIG. 3. A cross-sectional view of a microdisplay assembly 100 is shown wherein a plurality of contacts 130 comprising protruding features are formed over a portion, e.g., the contact region 120, of the semiconductor workpiece 104. The plurality of contacts 130 comprises gold ball stud bonds in some embodiments, for example. The plurality of contacts 130 may be formed using wire bond equipment, e.g., using a wire bonder, or a plating process may also be used to form the plurality of contacts 130. Alternatively, other methods may be used to form the plurality of contacts 130 comprising the protruding features, for example.

The plurality of contacts 130 may be spaced apart by a dimension $d_2$ of about 50 μm in some embodiments, for example, although alternatively, the pitch or spacing from center-to-center between the contacts 130 may comprise other dimensions. Each of the plurality of contacts 130 preferably comprises a protruding feature that extends away from the top surface of the workpiece 104 by a dimension $d_3$ of about 50 micrometers or more, although alternatively, the protruding features may comprise other dimensions. The footprint or width at the base of the contacts 130 may comprise about 25 μm or greater, as an example. Alternatively, the footprint of the contacts 130 may comprise other dimensions.

The contacts 130 preferably comprise gold or a gold-containing alloy in some embodiments, for example. The thick gold protrusion of the contacts 130 is more resistant to scratching than the bond pads typical of semiconductor devices, thus providing the ability to perform repeated tests directly to the contacts 130 without damaging the contacts 130, for example. Furthermore, the surface of gold does not oxidize, which is another advantage of using gold for the contacts 130. Thus, in some embodiments, the contacts 130 comprise gold or a gold-containing alloy, due to its resistance to damage, corrosion, and oxidation. However, alternatively, the contacts 130 may comprise other materials or alloys, such as copper or a copper-containing alloy. The contacts 130 generally may comprise conductive materials capable of forming reliable electrical conduction with a modest temperature processing (e.g., at temperatures of less than about 250° C.), such as soldering. The contacts 130 may comprise a solderable alloy in some embodiments, for example. Alternatively, an anisotropic conductive adhesive, rather than soldering, may be used to adhere the contacts 130 to a connecting device, to be described further herein.

Figure 4A:
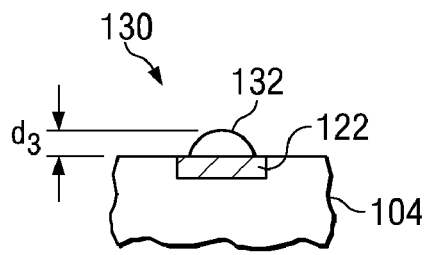
FIG. 4A shows a more detailed view of a protruding feature of the plurality of contacts, wherein the protruding feature comprises a bump.
Figure 4B:
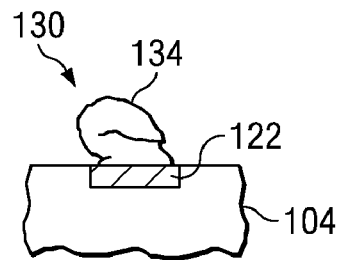
FIG. 4B shows a more detailed view of a protruding feature of the plurality of contacts, wherein the protruding feature comprises a loop.
Figure 4C:
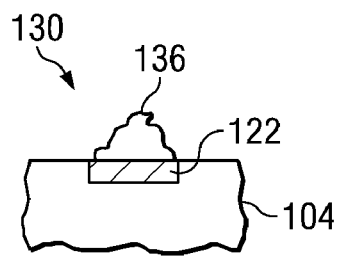
FIG. 4C shows a more detailed view of a protruding feature of the plurality of contacts, wherein the protruding feature comprises a cone-like feature.
Figure 4D:
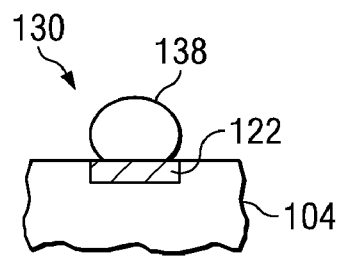
FIG. 4D shows a more detailed view of a protruding feature of the plurality of contacts, wherein the protruding feature comprises a portion of a sphere.

The protruding features of the plurality of contacts 130 of the microdisplay assembly 100 may substantially comprise a shape of a bump, a loop, a cone, or at least a portion of a sphere, although alternatively, the protruding features may comprise other shapes. FIG. 4A shows a more detailed view of a protruding feature of the plurality of contacts 130, wherein the protruding feature comprises a bump 132. The height or dimension $d_3$ of the protruding feature may comprise about 50 micrometers or greater, for example, although the height $d_3$ may comprise other dimensions. FIG. 4B shows a more detailed view of a protruding feature of the plurality of contacts 130, wherein the protruding feature comprises a loop 134. This shape is advantageous because an additional amount of metal, e.g., gold, is provided in the contact 130. FIG. 4C shows a more detailed view of a protruding feature of the plurality of contacts 130, wherein the protruding feature comprises a cone-like feature 136. The shape of the protruding feature may substantially comprise a cone; for example, the protruding feature may comprise a gold ball stud which may optionally be coined at the top (not shown). FIG. 4D shows a more detailed view of a protruding feature of the plurality of contacts 130, wherein the protruding feature comprises at least a portion of a sphere 138, as another example. The contact 130 is shown comprising about ¾ of a sphere 138 in FIG. 4D, for example.

Figure 5:
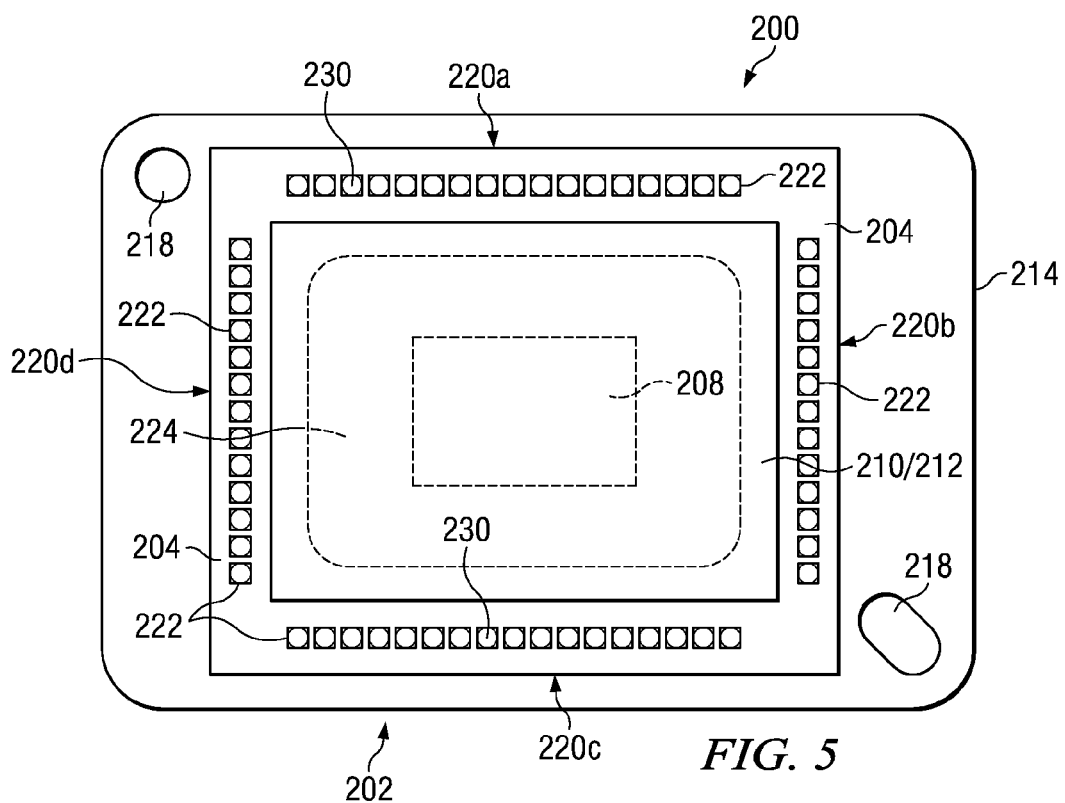
FIG. 5 shows a top view of a microdisplay assembly in accordance with an embodiment, wherein the plurality of contacts are formed on all sides of the microdisplay.

FIG. 5 shows a top view of a microdisplay assembly 200 in accordance with an embodiment, wherein the plurality of contacts 230 are formed on all sides of the microdisplay 200. Like numerals are used for the various elements that were described in FIGS. 1 through 4D. To avoid repetition, each reference number shown in FIG. 5 is not described again in detail herein. Rather, similar materials x02, x04, x06, x08, etc. are preferably used for the various elements and materials shown as were used to describe for FIGS. 1 through 4D, where x=1 in FIGS. 1 through 4D and x=2 in FIG. 5.

In this embodiment, the workpiece 204 comprises four contact regions 220a, 220b, 220c, and 220d disposed on each side, e.g., on all four sides of the microdisplay 202. The plurality of contacts 230 comprising protruding features are bonded to each bond pad 222 in the contact regions 220a, 220b, 220c, and 220d.

In accordance with embodiments, the plurality of contacts 130 and 230 may be directly contacted, e.g., using probe needles or other testing devices, to perform tests on the microdisplay assemblies 100 and 200. Again, because in some embodiments, the contacts 130 and 230 comprise thick gold, the contacts 130 and 230 are resistant to scratching and may be used for repeated tests. Alternatively, or after the testing, a connecting device may be coupled to, e.g., using solder or other electrical connection, the plurality of contacts 130 and 230. In some embodiments, the connecting device may comprise a pin grid array (PGA) package or a land grid array (LGA) package (not shown). The connecting device may comprise a ceramic PGA, which facilitates system assembly and reworks, for example. The connecting device may also comprise a connector used as interconnects in mobile electronic product devices (also not shown), as another example. The connecting device may comprise ceramic, plastic or other materials, as examples. Alternatively, the connecting device may comprise other types of connectors.

Figure 6:
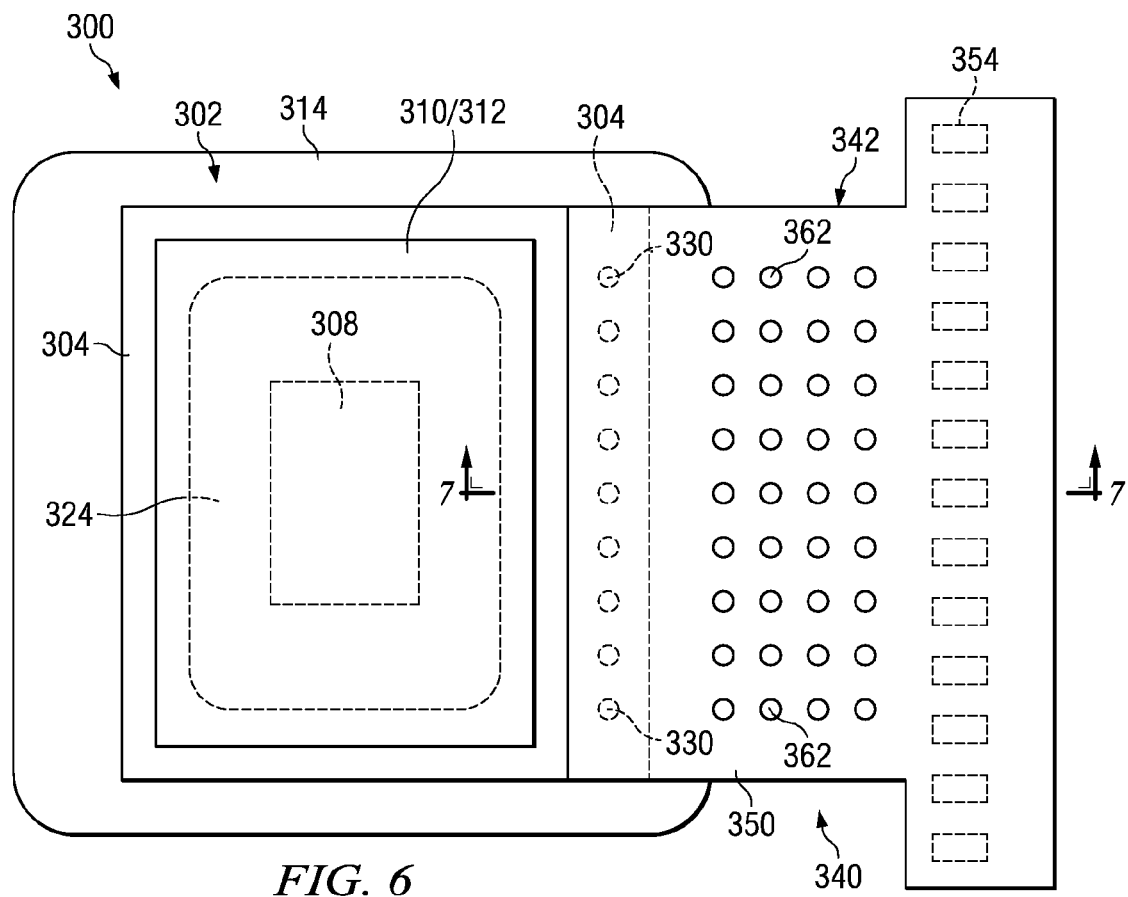
FIG. 6 shows a top view of a microdisplay assembly in accordance with another embodiment, wherein a flex printed wiring board (PWB) is coupled to one side.

In some embodiments, the microdisplay assembly includes a connecting device coupled to the plurality of contacts that comprises a flex PWB. FIG. 6 shows a top view of a microdisplay assembly 300 in accordance with one embodiment, wherein a connecting device comprising a flex printed wiring board (PWB) 340 is coupled to one side. Again, like numerals are used to refer to the various elements shown in FIG. 6 as were used to describe the previous figures, and to avoid repetition, each element is not described again herein. The plurality of contacts 330 are formed on a single side of the microdisplay assembly 300 in this embodiment. A cross-sectional view of the microdisplay assembly 300 including the flex PWB 340 is shown in FIG. 7.

Figure 7:
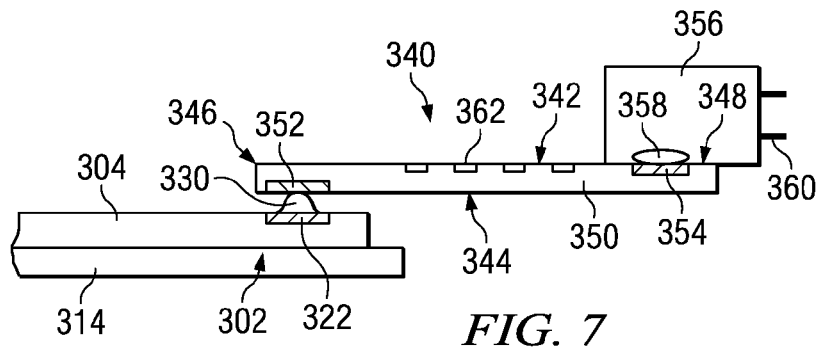
FIG. 7 shows a cross-sectional view of the microdisplay assembly shown in FIG. 6.

A more detailed cross-sectional view of the workpiece 304 is shown in FIG. 7, illustrating the bond pad 322 formed in the workpiece 304. The bond pad 322 may be formed in a conductive material layer of the workpiece 304, e.g., in an upper-most metallization layer of the semiconductor workpiece 304, for example. Alternatively, the bond pad 322 may be formed over an upper-most metallization layer of the semiconductor workpiece 304, for example, not shown. The contact 330 comprising the protruding feature is bonded to the bond pad 322.

The flex PWB 340 comprises a flexible material 350 and has a first side 342 comprising a top side, a second side 344 comprising a bottom side opposite the first side 342, a first end 346, and a second end 348 opposite the first end 346. The second side 344 of the flex PWB 340 includes a plurality of bond pads 352 at the first end 346 arranged in the same pattern as the contacts 330 bonded to the bond pads 322 of the workpiece 304. In some embodiments, the bond pads 352 are preferably solder-coated, for example, so that the bond pads 352 and/or contacts 330 may be locally heated to adhere or bond the bond pads 352 to the contacts 330, for example.

Alternatively, the bond pads 352 may not be solder-coated, and the contacts 330 may be attached to the bond pads 352 of the flex PWB 340 or other connecting device using an anisotropic conductive adhesive, such as epoxy filled with silver flakes, as an example, although other conductive adhesives may also be used. The bond pads 352 are also referred to herein as connecting regions, for example.

To adhere the flex PWB 340 to the microdisplay 302, a pick-and-place tool may be used to place and align the flex PWB 340 with the plurality of contacts 330 on the workpiece 304. The solder-coated bond pads 352 are locally heated to a temperature sufficient for the solder to form a metallic bond with the gold balls of the contacts 330, for example. Advantageously, the local heating and subsequent cooling of the solder is rapid and only affects a small amount of material, with minimal or no effect on the optical device region 308. Ultrasonic energy or radiation energy may also be used to bond the bond pads 352 to the contacts 330, for example.

Figure 9:
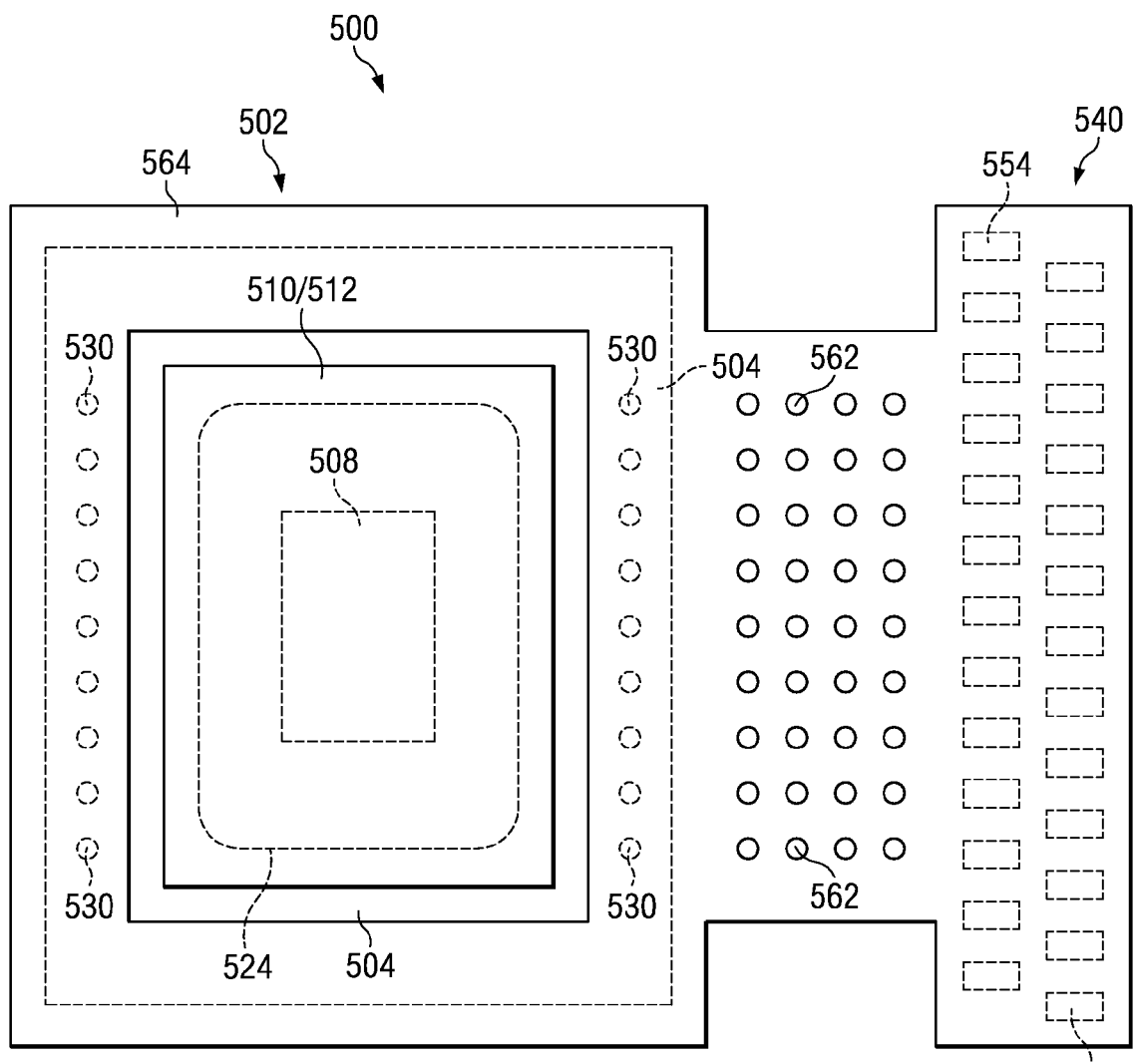
FIG. 9 shows a top view of an embodiment wherein the flex PWB coupled to the microdisplay assembly comprises a surrounding flex PWB.
Figure 10:
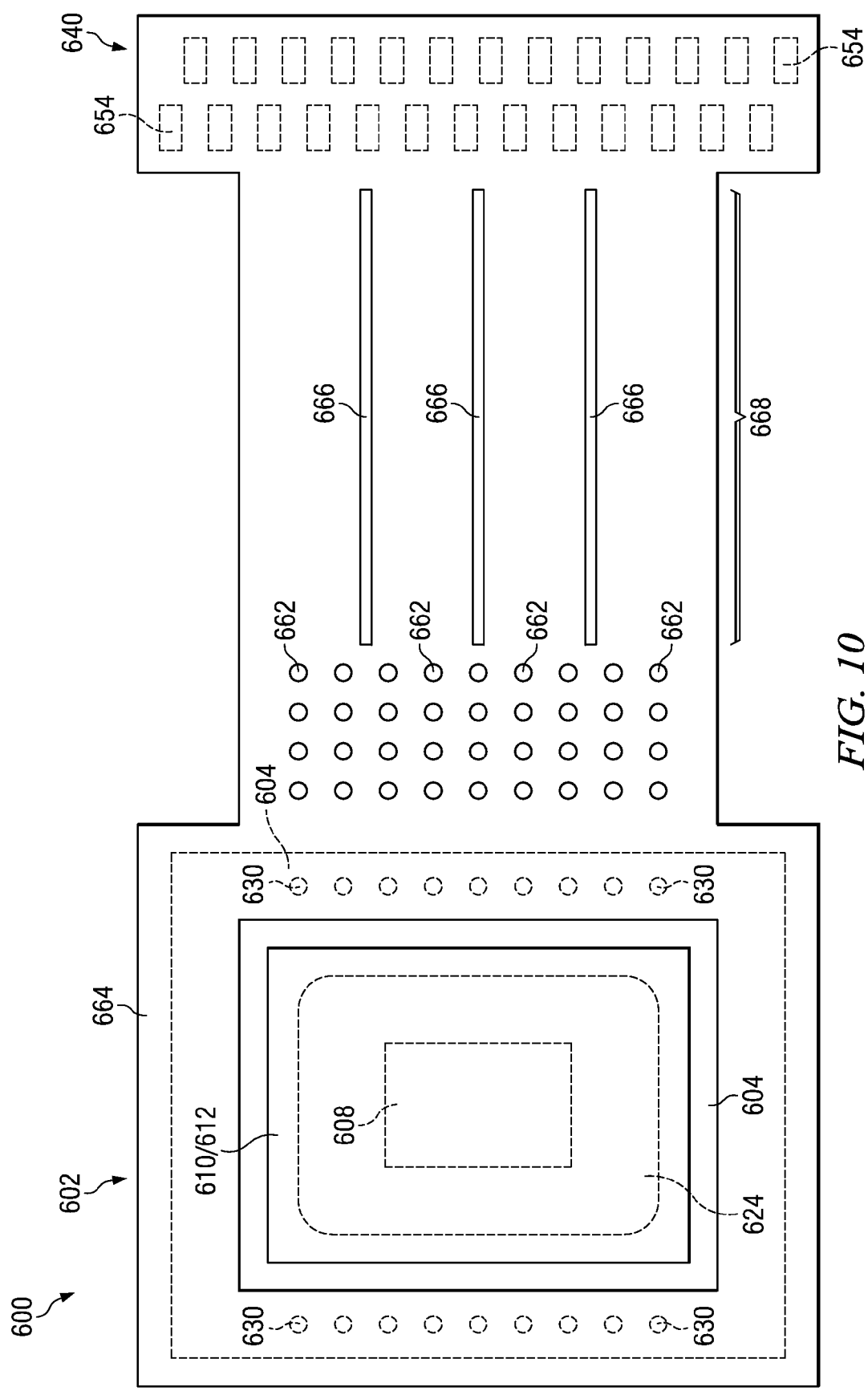
FIG. 10 shows a top view of an embodiment wherein the flex PWB comprises an extended portion having a plurality of slits formed therein.

The first side 342 of the flex PWB 340 may comprise a plurality of contacts 354 for a printed circuit board (PCB) connector 356 at the second end 348. Alternatively, the contacts 354 may be disposed on the second side 344 of the flex PWB 340, for example. The plurality of contacts 354 may comprise an array of rows and columns of contacts 354, for example, as shown. The plurality of contacts 354 may comprise a single column of contacts 354, as shown in FIG. 6, or may comprise two or more columns of contacts 554 and 654, as shown in FIGS. 9 and 10, for example.

Referring again to FIG. 6, the contacts 354 may comprise bond pads or other types of connections adapted to connect to the PCB connector 356, for example. A PCB connector 356 is also shown in FIG. 7 having a plurality of pins 358 adapted to connect to the contacts 354 and a plurality of pins 360 coupled within the connector 356 to pins 358, as an example. Alternatively, the PCB connector 356 may comprise sockets on both sides, or pins on one side and sockets on another, as examples, not shown. The PCB connector 356 is preferably selected to mate with a mating PCB connector of a projection system or other application the microdisplay assembly 300 is to be used in, for example.

The flex PWB 340 may optionally include a plurality of test pads 362 disposed on the first side 342, as shown in FIGS. 6 and 7. The test pads 362 on the flex PWB 340 advantageously provide the ability to perform tests on the microdisplay assembly 300 after the flex PWB 340 has been attached to the plurality of contacts 330 comprising the protruding features, for example. Test pads 362 may also be disposed on the second side 344 of the flex PWB 340, for example, not shown.

In this embodiment, the plurality of contacts 330 may be spaced apart by a pitch of about 120 μm, and the routing pitch of the contacts 354 for a PCB connector may be about 1 mm, as examples. Alternatively, the contacts 330 and contacts 354 may be spaced apart by other dimensions.

Figure 8:
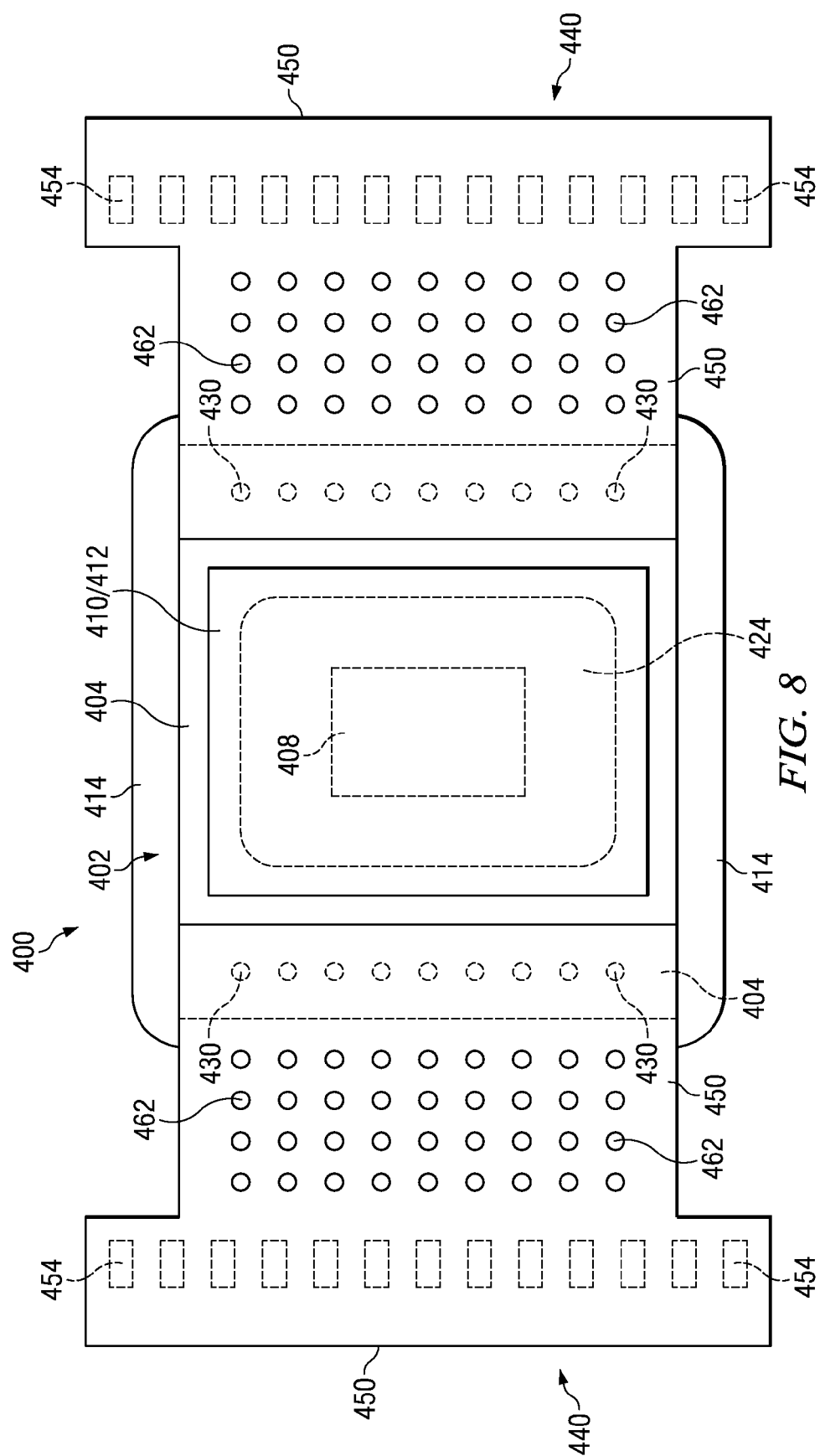
FIG. 8 shows a top view of yet another embodiment, wherein a flex PWB is coupled to two sides of a microdisplay assembly.

FIG. 8 shows a top view of yet another embodiment, wherein a flex PWB 440 is coupled to two sides of a microdisplay 402. Again, like numerals are used to refer to the various elements shown in FIG. 8 as were used to describe the previous figures. To avoid repetition, each element is not described again herein with regard to FIG. 8, or with regard to FIGS. 9 through 12.

The plurality of contacts 430 comprising protruding features are formed on two opposite sides of the microdisplay 402 in the embodiment shown in FIG. 8. A flex PWB 440 is then attached to each side, as described for the embodiment shown in FIGS. 6 and 7, as examples. The flex PWBs 440 include contacts 454 for a PCB connector at one end, which may be used to connect to system connectors in a projection system or other application the microdisplay assembly 400 is implemented in, for example. Optional test pads 462 may be disposed on the flex PWB 440, as shown.

The flex PWBs 440 are shown in FIG. 8 being installed on opposite sides of the microdisplay 402. Optionally, two flex PWBs 440 may be attached to the contacts 430 on the workpiece 404 on two adjacent sides, on three sides, or on all four sides of the microdisplay 402 (e.g., such as on the microdisplay 202 shown in FIG. 5 having bond pads 222 and contacts 230 with protruding features formed on all four sides).

FIG. 9 shows a top view of an embodiment wherein the flex PWB 540 of the microdisplay assembly 500 comprises a surrounding flex PWB. The flex PWB 540 includes a surrounding portion 564 comprising a similar shape and size as a perimeter of the microdisplay 502, e.g., of the transparent window 512 disposed over and proximate the top of the microdisplay 502. The surrounding portion 564 may include bond pads on the bottom surface on one or more sides that are adapted to attach and make electrical and mechanical connection with the plurality of contacts 530 on the workpiece 504, shown in phantom.

FIG. 10 shows a top view of yet another embodiment, wherein the flex PWB 640 comprises an extended portion 668 having a plurality of slits 666 formed therein. The slits 666 provide increased flexibility of the flex PWB 640 and may make it easier to connect a PCB connector coupled to the contacts 654 to other system connectors, for example. Note that the optional slits 666 and extended portion 668 may also be used in the embodiments shown in FIGS. 6 and 8 wherein the flex PWBs 340 and 440 do not include a surrounding portion 664, for example. The slits 666 reduce torsional stiffness and reduce the stress on the interface of the flex PWB 640 and the workpiece 604.

Figure 11:
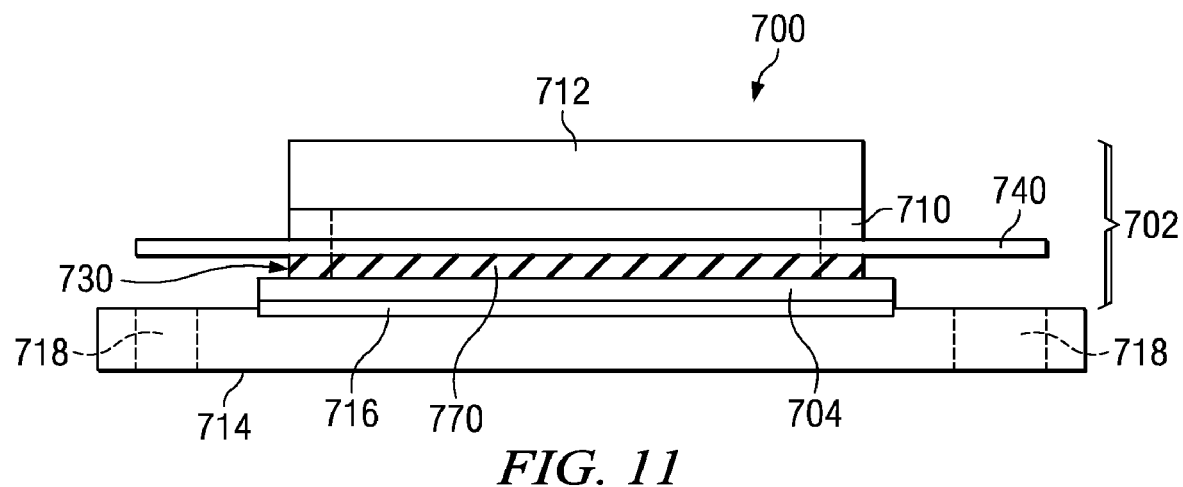
FIG. 11 shows a cross-sectional view of an embodiment wherein the microdisplay assembly includes an underfill material disposed under the flex PWB.
Figure 12:
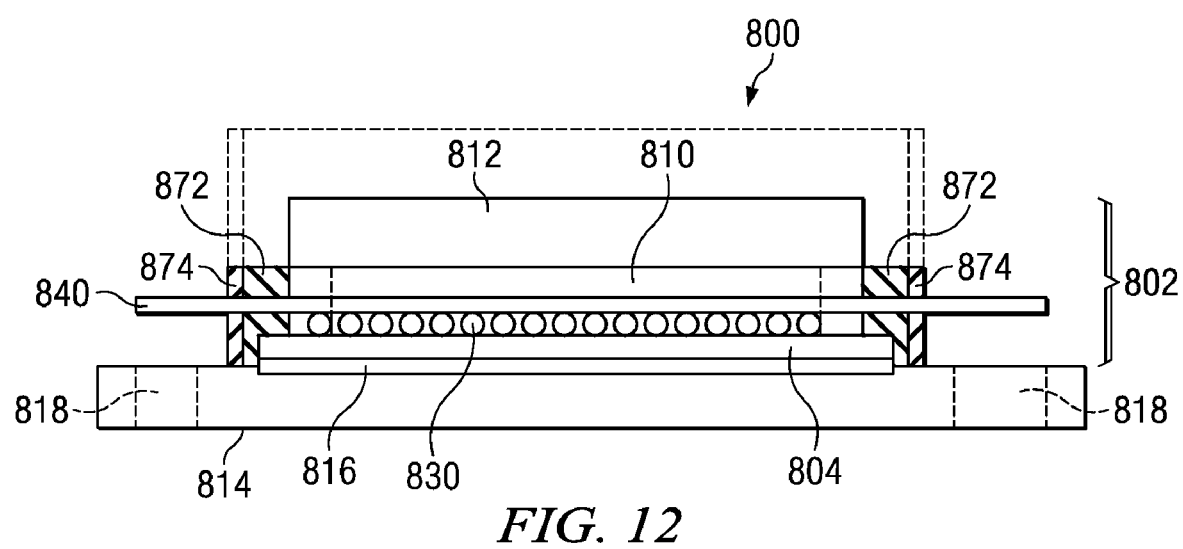
FIG. 12 shows a cross-sectional view of an embodiment that includes an encapsulating material disposed over at least the plurality of contacts of the microdisplay assembly.

Other optional features that may be included in the microdisplay assemblies 100, 200, 300, 400, 500, and 600 described herein are an underfill material and an encapsulation material. For example, FIG. 11 shows a cross-sectional view of an embodiment wherein the microdisplay assembly includes an underfill material 770 disposed between the flex PWB 740 and at least the semiconductor workpiece 704. FIG. 12 shows a cross-sectional view of an embodiment that includes an encapsulating material 872 disposed over at least the plurality of contacts 830 of the microdisplay assembly 800.

The optional underfill material 770 shown in FIG. 11 may comprise an insulator such as epoxy or other material that is applied after the flex PWB 740 is attached, or is used to attach the flex PWB 740, for example. The underfill material 770 is disposed under the flex PWB 740. The underfill material 770 may cover the plurality of contacts 730 comprising the protruding features. The underfill material 770 may fill the gap between the flex PWB 740 and at least the semiconductor workpiece 704, for example. The underfill material 770 may also be extended laterally or horizontally to adhere the flex PWB 740 to the support 718, for example, not shown, providing additional structural strength.

In some embodiments, the underfill material 770 may optionally comprise a pre-cured film that is cured when the contacts 730 are soldered to the connecting regions or bond pads (see 352 in FIG. 7) of the flex PWB 740. This results in a reduction in the number of manufacturing process steps, because an additional heat cycle is not required to cure the underfill material 770, for example.

The optional encapsulation material 872 shown in FIG. 12 may comprise an insulator such as an epoxy molding compound, as an example, although alternatively, other materials may also be used, that is applied after the flex PWB 840 is attached, or after the underfill material 770 shown in FIG. 11 is applied. The encapsulation material 872 may cover at least the plurality of contacts 830 comprising the protruding features, for example, and optionally may cover other portions of the microdisplay 802. A frame 874 may be attached to the microdisplay 802 to ensure the flow of the encapsulation material 872 is contained and to control the application of the encapsulation material 872, for example. The frame 874 and the encapsulation material 872 may extend below a top surface of the interposer 810, or may extend to a top surface of the interposer 810, as shown. Alternatively, the frame 874 and the encapsulation material 872 may extend above a top surface of the interposer 810, e.g., and may extend above a top surface of the transparent window 812, as shown in phantom in FIG. 12, for example.

In accordance with some embodiments, novel microdisplay assemblies 100, 200, 300, 400, 500, 600, 700, and 800 are provided. Embodiments also include projection display systems including the microdisplay assemblies 100, 200, 300, 400, 500, 600, 700, and 800 described herein. The microdisplay assemblies 100, 200, 300, 400, 500, 600, 700, and 800 may be implemented in projection display systems in handheld applications, desktop applications, TV applications, projector applications, cinema applications, or other applications, as examples.

Other embodiments include novel methods of packaging microdisplays 102, 202, 302, 402, 502, 602, 702, and 802. For example, in one embodiment, a method of packaging a microdisplay 102, 202, 302, 402, 502, 602, 702, and 802 includes providing a support 114, 214, 314, 414, 514, 614, 714, and 814, and providing the microdisplay 102, 202, 302, 402, 502, 602, 702, and 802, the microdisplay 102, 202, 302, 402, 502, 602, 702, and 802 including a semiconductor workpiece 104, 204, 304, 404, 504, 604, 704, and 804 and an optical device region 108, 208, 308, 408, 508, 608, 708, and 808 disposed over the semiconductor workpiece 104, 204, 304, 404, 504, 604, 704, and 804. The microdisplay 102, 202, 302, 402, 502, 602, 702, and 802 is attached to the support 114, 214, 314, 414, 514, 614, 714, and 814, and a plurality of contacts 130, 230, 330, 430, 530, 630, 730, and 830 is formed over the semiconductor workpiece 104, 204, 304, 404, 504, 604, 704, and 804, wherein each of the plurality of contacts 130, 230, 330, 430, 530, 630, 730, and 830 comprises a protruding feature.

Other embodiments include methods of testing microdisplays. For example, in one embodiment, a method of testing a microdisplay 102, 202, 302, 402, 502, 602, 702, and 802 includes providing the microdisplay 102, 202, 302, 402, 502, 602, 702, and 802, the microdisplay 102, 202, 302, 402, 502, 602, 702, and 802 including a semiconductor workpiece 104, 204, 304, 404, 504, 604, 704, and 804 and an optical device region 108, 208, 308, 408, 508, 608, 708, and 808 disposed over the semiconductor workpiece 104, 204, 304, 404, 504, 604, 704, and 804, the semiconductor workpiece 104, 204, 304, 404, 504, 604, 704, and 804 of the microdisplay 102, 202, 302, 402, 502, 602, 702, and 802 being attached to a support 114, 214, 314, 414, 514, 614, 714, and 814. A plurality of contacts 130, 230, 330, 430, 530, 630, 730, and 830 is formed over the semiconductor workpiece, each of the plurality of contacts 130, 230, 330, 430, 530, 630, 730, and 830 comprising a protruding feature. The microdisplay 102, 202, 302, 402, 502, 602, 702, and 802 is tested by probing at least one of the plurality of contacts 130, 230, 330, 430, 530, 630, 730, and 830. The method may further include: after testing the microdisplay 102, 202, 302, 402, 502, 602, 702, and 802, coupling a connecting device (such as a flex PWB 340, 440, 540, 640, 740, or 840, or a PGA, LGA, or mobile interconnect device) to the plurality of contacts 130, 230, 330, 430, 530, 630, 730, and 830, the connecting device having a plurality of test pads 362, 462, 562 or 662 disposed thereon; and testing the microdisplay 102, 202, 302, 402, 502, 602, 702, and 802 by probing at least one of the plurality of test pads 362, 462, 562 or 662.

Advantages of embodiments described herein include providing novel microdisplay assemblies 100, 200, 300, 400, 500, 600, 700, and 800 and methods of packaging microdisplays 102, 202, 302, 402, 502, 602, 702, and 802 such as DMDs and other optical semiconductor devices. The protruding features of the novel contacts 130, 230, 330, 430, 530, 630, 730, and 830 described herein provide excellent contacts for testing and also for making connection to connecting devices. The contacts 130, 230, 330, 430, 530, 630, 730, and 830 may comprise thick gold balls or other shapes that allow multiple touch-downs and probes (e.g., of probe needles) reliably, e.g., for testing purposes. The thick gold balls or protrusions and large footprint of the contacts 130, 230, 330, 430, 530, 630, 730, and 830 allow a large contact force without damaging the microdisplays 102, 202, 302, 402, 502, 602, 702, and 802. Probe and test capability of the microdisplay assemblies 100, 200, 300, 400, 500, 600, 700, and 800 is increased by the use of the novel contacts 130, 230, 330, 430, 530, 630, 730, and 830. Furthermore, because the contacts 130, 230, 330, 430, 530, 630, 730, and 830 comprise gold in some embodiments, oxidation of the contact surface is avoided.

The contacts 130, 230, 330, 430, 530, 630, 730, and 830 allow the use of flex PWBs 340, 440, 540, 640, 740, and 840 in microdisplay assemblies 100, 200, 300, 400, 500, 600, 700, and 800, providing a large amount of flexibility in the types and sizes of connectors that may be used in the projection systems, and providing the ability to lower costs, by allowing a choice of less expensive connectors. The size and shape of the flex PWBs 340, 440, 540, 640, 740, and 840, and the use of the extended portion 668 and/or slits 666 can be selected to provide ease of connection in a projection system or other applications, for example. The overall costs of connectors in the microdisplay assemblies 100, 200, 300, 400, 500, 600, 700, and 800 and the projection systems they are used in may be reduced by the use of PCB connectors 356.

Because flex PWBs 340, 440, 540, 640, 740, and 840 are used in some embodiments, expensive chip carrier packages are not required, reducing costs of the packaged microdisplay assemblies 100, 200, 300, 400, 500, 600, 700, and 800 significantly, and avoiding the need for complex embedded wiring. Furthermore, fragile bonding wires that require encapsulation are not required in accordance with the embodiments described herein. The contacts 130, 230, 330, 430, 530, 630, 730, and 830 with protruding features of embodiments described herein are not required to be encapsulated, but rather, may be optionally encapsulated with encapsulation material 872 to seal the various interfaces of the elements described herein. For example, encapsulation may not be required if the interface of the transparent window 112, 212, 312, 412, 512, 612, 712, and 812 to the interposer 110, 210, 310, 410, 510, 610, 710, and 810, and the interface of the interposer 110, 210, 310, 410, 510, 610, 710, and 810 to the workpiece 104, 204, 304, 404, 504, 604, 704, and 804 are designed and/or tested to be reliable.

Another advantage of using flex PWBs 340, 440, 540, 640, 740, and 840 in the novel microdisplay assemblies 100, 200, 300, 400, 500, 600, 700, and 800 is that the use of unique carriers for each size of DMD or microdisplay in a product family may be avoided. A universal type of flex PWB 340, 440, 540, 640, 740, or 840 may be selected for many sizes and types of DMDs, LCOS microdisplay panels, or LCD microdisplay panels, for example. One flex PWB 340, 440, 540, 640, 740, or 840 may fit multiple DMDs of similar die sizes, e.g., if the die are designed to have a standard input/output (I/O) layout on the workpiece 304, 404, 504, 604, 704, and 804. This results in further cost reduction, by reducing non-recurring engineering (NRE) costs and reducing prototype cycle time. The flex PWB 340, 440, 540, 640, 740, and 840 interconnect may advantageously be customized to accommodate special system requirements.

A large amount of heat is not required to bond the flex PWBs 340, 440, 540, 640, 740, and 840 and other connecting devices to the plurality of contacts 130, 230, 330, 430, 530, 630, 730, and 830, advantageously avoiding damage to the optical device regions 108, 208, 308, 408, 508, 608, 708, and 808. In some embodiments, the contacts 130, 230, 330, 430, 530, 630, 730, and 830 are bonded to connecting devices using a conductive adhesive that may not require heat to apply, for example.

The novel microdisplay assemblies 100, 200, 300, 400, 500, 600, 700, and 800 including the contacts 130, 230, 330, 430, 530, 630, 730, and 830 and flex PWBs 340, 440, 540, 640, 740, and 840 described herein are easily implementable into existing assembly and test process flows. The microdisplay assemblies 100, 200, 300, 400, 500, 600, 700, and 800 described herein may comprise optical device regions 108, 208, 308, 408, 508, 608, 708, and 808 including DMDs, LCOS microdisplay panels, or LCD microdisplay panels, as examples.

The optional underfill material 770 may be used to secure the flex PWB 740 to the workpiece 704, and optionally also to the support 714, providing additional structural support and strength. The underfill material 770 may comprise a pre-cured film that is cured when the contacts 730 are soldered to the connecting regions or bond pads (see 352 in FIG. 7) of the flex PWB 740, reducing the number of manufacturing process steps, in some embodiments.

The supports 114, 214, 314, 414, 514, 614, 714, and 814 may comprise plastic, ceramic or a metal. In some embodiments, the supports 114, 214, 314, 414, 514, 614, 714, and 814 preferably comprise a metal for improved heat transfer, and to allow magnetic carrier capability; e.g., the microdisplay assemblies 100, 200, 300, 400, 500, 600, 700, and 800 may advantageously be transported and positioned using magnetic carriers. The supports 114, 214, 314, 414, 514, 614, 714, and 814 may also be used for system optical alignment.

Although the embodiments and their advantages have been described in detail, it should be understood that various changes, substitutions and alterations can be made herein without departing from the spirit and scope of the invention as defined by the appended claims. Furthermore, the embodiments described herein may be implemented separately or in any combination with each other. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A microdisplay assembly, comprising:
    a support;
    a microdisplay disposed on the support, the microdisplay including a semiconductor workpiece having a first side mounted to the support and an opposing second side over which an optical device region is disposed; and
    a plurality of contacts having a protruding feature disposed over a portion of the second side of the semiconductor workpiece, wherein the protruding features of the plurality of contacts comprise gold, a gold-containing alloy, copper, a copper-containing alloy, or a solderable alloy.

2. The microdisplay assembly according to claim 1, wherein the protruding features of the plurality of contacts substantially comprise a shape of a bump, a loop, a cone-like feature, or at least a portion of a sphere.

3. The microdisplay assembly according to claim 1, further comprising a connecting device coupled to the plurality of contacts.

4. The microdisplay assembly according to claim 3, wherein the connecting device comprises a pin grid array (PGA) package, a land grid array (LGA) package, or a mobile electronic product interconnect device.

5. The microdisplay assembly according to claim 3, wherein the connecting device comprises a flex printed wiring board (PWB), the flex PWB including a plurality of connecting regions, the protruding features of the plurality of contacts being coupled to the plurality of connecting regions of the flex PWB.

6. The microdisplay assembly according to claim 5, wherein the flex PWB includes at least one test pad.

7. The microdisplay assembly according to claim 5, wherein the flex PWB comprises an array of contacts for a printed circuit board (PCB) connector, further comprising a printed circuit board (PCB) connector coupled to the array of contacts.

8. A method of packaging a microdisplay, the method comprising:
    providing a support;
    providing a microdisplay, the microdisplay including a semiconductor workpiece having a first side and an opposing second side, and an optical device region disposed over the second side of the semiconductor workpiece, a plurality of contacts having a protruding feature on the second side of the semiconductor workpiece, wherein the protruding features of the plurality of contacts comprise gold, a gold-containing alloy, copper, a copper-containing alloy, or a solderable alloy; and
    attaching first side of the microdisplay to the support.

9. The method according to claim 8, further comprising soldering at least one flex printed wiring board (PWB) to the plurality of contacts or attaching at least one flex PWB to the plurality of contacts using an anisotropic conductive adhesive.

10. The method according to claim 9, wherein soldering the at least one flex PWB comprises using localized heat, ultrasonic energy, or radiation energy.

11. The method according to claim 9, further comprising forming at least one slit in the flex PWB.

12. The method according to claim 9, further comprising disposing an underfill material between the flex PWB and at least the semiconductor workpiece.

13. The method according to claim 12, wherein soldering the at least one flex PWB to the plurality of contacts further comprises curing the underfill material.

14. The method according to claim 9, wherein the microdisplay comprises four sides, wherein soldering or attaching the at least one flex PWB to the plurality of contacts comprises attaching a single flex PWB to one side of the microdisplay, attaching a flex PWB to at least two sides of the microdisplay, or attaching a single surrounding flex PWB to all four sides of the microdisplay.

15. The method according to claim 8, wherein forming the plurality of contacts comprises forming each contact over a bond pad of the semiconductor workpiece, and wherein the protruding feature of the plurality of contacts extends away from a top surface of the workpiece by about 50 micrometers or greater.

16. The method according to claim 8, further comprising forming an encapsulating material over at least the plurality of contacts.

17. The method according to claim 16, further comprising disposing a frame at least around the plurality of contacts, before forming the encapsulating material, wherein forming the encapsulating material comprises forming the encapsulating material within the frame.

18. A method of testing a microdisplay, the method comprising:
providing a microdisplay, the microdisplay including a semiconductor workpiece having a first side and an opposing second side over which an optical device region is disposed, a plurality of contacts comprising a protruding feature formed on the second side, wherein the protruding features of the plurality of contacts comprise gold, a gold-containing alloy, copper, a copper-containing alloy, or a solderable alloy, the first side of the semiconductor workpiece being attached to a support; and testing the microdisplay by probing at least one of the plurality of contacts.

19. The method according to claim 18, further comprising: after testing the microdisplay, coupling a connecting device to the plurality of contacts, the connecting device having a plurality of test pads disposed thereon; and testing the microdisplay by probing at least one of the plurality of test pads.

* * * * *